(12) United States Patent
Gerald, II et al.

(10) Patent No.: US 7,226,549 B2
(45) Date of Patent: Jun. 5, 2007

(54) HIGH CATION TRANSPORT POLYMER ELECTROLYTE

(75) Inventors: Rex E. Gerald, II, Brookfield, IL (US); Jerome W. Rathke, Homer Glen, IL (US); Robert J. Klingler, Westmont, IL (US)

(73) Assignee: UChicago Argonne, LLC, Chicago, IL (US)

( * ) Notice: Subject to any disclaimer, the term of this patent is extended or adjusted under 35 U.S.C. 154(b) by 0 days.

(21) Appl. No.: 10/315,904

(22) Filed: Dec. 10, 2002

(65) Prior Publication Data

US 2003/0138702 A1 Jul. 24, 2003

Related U.S. Application Data

(60) Provisional application No. 60/339,619, filed on Dec. 12, 2001, provisional application No. 60/339,812, filed on Dec. 10, 2001.

(51) Int. Cl.
*H01M 10/40* (2006.01)

(52) U.S. Cl. .................. 252/500; 252/511; 252/519.3; 252/519.4; 429/307; 429/317; 429/322

(58) Field of Classification Search ................ 252/500, 252/511, 519.2, 519.31; 429/307, 317, 304, 429/322
See application file for complete search history.

(56) References Cited

U.S. PATENT DOCUMENTS

| 4,369,103 | A | * | 1/1983 | White | 204/252 |
|---|---|---|---|---|---|
| 4,602,640 | A | * | 7/1986 | Wada et al. | 600/395 |
| 4,914,161 | A | * | 4/1990 | Muller et al. | 525/403 |
| 5,116,541 | A | * | 5/1992 | Motogami et al. | 252/519.21 |
| 5,358,801 | A | * | 10/1994 | Brodd | 429/215 |
| 5,378,405 | A | * | 1/1995 | Gutman et al. | 252/500 |
| H01546 | H | * | 6/1996 | Walker, Jr. | 429/307 |
| 5,779,632 | A | * | 7/1998 | Dietz et al. | 600/391 |
| 5,965,281 | A | * | 10/1999 | Cao | 430/319 |
| 6,248,479 | B1 | * | 6/2001 | Takeda et al. | 429/300 |
| 6,472,104 | B1 | * | 10/2002 | Ulrich et al. | 429/302 |

FOREIGN PATENT DOCUMENTS

| GB | 2 216132 A | * | 10/1989 |
|---|---|---|---|
| JP | 63-136407 | * | 6/1988 |
| JP | 63-136408 | * | 6/1988 |
| JP | 63-193954 | * | 8/1988 |
| JP | 06220147 | * | 8/1994 |

* cited by examiner

*Primary Examiner*—Mark Kopec
*Assistant Examiner*—Kallambella Vijayakumar
(74) *Attorney, Agent, or Firm*—Olson & Hierl, Ltd.; Harry M. Levy (57) ABSTRACT

A solid state ion conducting electrolyte and a battery incorporating same. The electrolyte includes a polymer matrix with an alkali metal salt dissolved therein, the salt having an anion with a long or branched chain having not less than 5 carbon or silicon atoms therein. The polymer is preferably a polyether and the salt anion is preferably an alkyl or silyl moiety of from 5 to about 150 carbon/silicon atoms.

1 Claim, 10 Drawing Sheets

HIGH CATION TRANSPORT POLYMER ELECTROLYTE

RELATED APPLICATIONS

This application claims priority under 35 U.S.C. §1.78(a)(3) provisional application Ser. No. 60/339,619 filed Dec. 12, 2001, and 60/339,812 filed Dec. 10, 2001, the entire contents of which are incorporated herein by reference.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

Solid-state materials that function as ion conductors (electrolytes) are needed to replace caustic and flammable liquid electrolytes that are used in rechargeable batteries. Consumer electronic devices such as CD players, laptop computers, and electronic cameras continue to increase the demand for low cost, lightweight, and long lasting rechargeable batteries. In addition, a solid-state electrolyte can be adapted to a multitude of battery geometries. For example, the flat and thin geometry of laptop computers could take advantage of a flat and thin battery, incorporated into the case of the computer. A safety issue of laptop computers is the containment of flammable and corrosive electrolytes in the event that the battery container is cracked or punctured. Safety concerns would be greatly reduced if a suitable solid-state electrolyte were developed.

The mechanical and electrochemical properties of solid-state polymer electrolyte materials can be tailored for diverse applications. One application such as the flash unit on electronic cameras requires an electrolyte with high ionic conductivity; in another application the rheology properties of the material would be the key issue, due to packaging constraints. In yet another application, the cost of the electrolyte would be the dominant factor.

SUMMARY OF THE INVENTION

The present invention relates to a new polymer electrolyte that is easily synthesized from a mixture of inexpensive materials, preferably, but not necessarily, poly(ethylene oxide) (typically written PEO) and lithium lauryl sulfate salt, also known as lithium dodecyl sulfate. The dodecyl sulfate salt with a sodium or ammonium cation is a major component of hair care products (e.g., shampoo). The invention uses an anion with a long chain, preferably an alkane, that provides two advantages for decreasing the undesirable mobility of the anion relative to a highly mobile lithium cation. The first advantage is the molecular mass and size of the preferred alkyl sulfate anion. An anion with greater mass and size compared to the triflate and imide anions (current candidates for polymer electrolyte materials) has reduced mobility. In addition, the choice of the preferred alkane chain provides the opportunity for specific interactions between the polymer chain and the anion. These molecular interactions may result in additional resistance for anion transport. Another consequence of polymer-chain/anion-chain interactions is suppression of polymer crystallization. Polymer electrolyte materials that use poly(ethylene oxide) have historically had a propensity for crystallization. Crystallization of the pure polymer and of a stoichiometric complex of the polymer and salt is established. Salt that is complexed with the polymer in a crystalline solid does not conduct ions. Crystalline PEO also does not participate in ion conduction, but does impart important rheology properties (e.g., rigidity).

Accordingly, it is an object of the invention to provide a solid state ion conducting electrolyte with a polymer matrix having an alkali metal salt dissolved therein, wherein the salt has a long or branched chain anion having not less than 5 carbon or silicon atoms therein.

Another object of the invention is to provide an ion conducting electrolyte with a polymer matrix having dissolved therein a salt with a lithium cation and an anion containing an alkyl chain, wherein the alkyl moiety has at least 5 carbon atoms inhibiting the mobility thereof in the polymer matrix.

Yet another object is to provide a rechargeable battery having a cathode containing alkali metal atoms and an anode separated by a solid-state-ion conducting electrolyte with a polymer matrix having an alkali metal salt dissolved therein, wherein the salt has an anion containing a long or branched chain having not less than 5 carbon or silicon atoms therein.

Still another object of the invention is to provide a rechargeable battery having a cathode containing lithium atoms and an anode separated by a solid-state-ion conducting electrolyte with a polymer matrix with ether oxygens, the polymer matrix having dissolved therein lithium cations and anions containing alkyl chains, the alkyl chains having at least 5 carbon atoms, wherein the anions have lower transport properties than the lithium cations.

A final object of the invention is to provide a method of making the rechargeable batteries and electrolytes described along with flexible electrolytes of various predetermined shapes.

These and other objects of the invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE INVENTION

The invention presented herein encompasses a variety of polymer matrices to form a solid state ion conducting electrolyte. Although polymer matrices disclosed herein are carbon based, silicon may also be the central building block of polymers which could adequately function in the present invention. Moreover, the polymer matrix used preferably, but not necessarily, has ether oxygens and more preferably is a carbon based long chain alkane. Although poly(ethylene oxide) is the preferred matrix, other polyethers may be employed such as poly(propylene oxide) or mixtures of poly(propylene oxide) and poly(ethylene oxide) or copolymers thereof.

Although specific lithium salts are disclosed as preferable compounds, any alkali metal salt may be substituted, however, lithium metal is preferred. A variety of alkali metals, mixtures and alloys thereof may be employed. The salt employed preferably has an anion that contains a long or branched alkyl chain which also preferably has not less than 5 carbon or silicon atoms. Although specific sulfate salts are disclosed in the present invention, a variety of salts may be used, such as carbonates as well as others.

Where the alkali metal in the electrolyte is lithium and the polymer matrix has ether oxygens, it is preferred that the ratio of the number of oxygen atoms in the matrix to the number of lithium atoms in the salt is between about 5 and about 60 with 8, 24, and 50 being preferred ratios. A significant advantage of the present invention is that the electrolyte made in accordance with the present invention may take a variety of shapes, all of which, if required, may be flexible such as films, discs or the like.

As is known in the art, the crystalline form of poly (ethylene oxide) does not dissolve salt therein whereas the amorphous form of poly(ethylene oxide) does. Therefore, an advantage of the present invention is that a greater percentage of poly(ethylene oxide) is in the amorphous form, compared to other poly(ethylene oxides)-based polymer electrolytes, and therefore a greater amount of the electrolyte salt may be dissolved in the amorphous poly(ethylene oxide) or polymer matrix.

In the preferred embodiment of the present invention, the polymer matrix has a molecular weight in the range of not less than about 1000 and not greater than about 2 million and the salt has an alkyl moiety, that has between 5 and about 150 carbon atoms. As shown hereafter, the electrolyte of the present invention may be incorporated within a rechargeable battery to provide an improved rechargeable battery with a molecular weight of the polymer matrix providing design capabilities for the physical properties of the electrolyte. The larger the alkyl chain of the salt the waxier is the electrolyte made therefrom.

Referring now to the preferred embodiment of the present invention, a lithium salt is preferred because of the activity of lithium. The lithium salt must be easily dissolved in the polymer host at a concentration of approximately 1 molar to provide a large number of charge carriers (ions). The salt and the polymer host can be dry-mixed and heated to a uniform and homogeneous solid solution. Alternatively, the salt and PEO can be dissolved simultaneously in tetrahydrofuran (THF), ($CH_2CH_2CH_2CH_2O$), acetonitrile ($CH_3CN$), or other aprotic polar solvent. When solvent is used to assist the dissolution process, the solvent must be removed completely to leave a homogeneous solid solution of the salt and polymer host. The conductivity of the solid polymer electrolyte (SPE) is directly proportional to the number of charge carriers and their mobility; therefore, high salt concentrations are desirable, and weak interactions between the cation charge carriers and the polymer host results in high cation mobility. A measure of bulk conductivity of the SPE is indicative of the mobility of both cations and anions, and is not a sufficient indicator for the cation transport properties of the material. Nevertheless, a conductivity measurement in the range of approximately $10^{-2}$–$10^{-4}$ S cm$^{-1}$ is highly desirable and is good initial evidence that the SPE is viable as a promising material for batteries.

It is highly desirable that the conductivity of the SPE is attributed largely or completely to the mobility of the cations ($Li^+$ ions), and not at all to mobility of the anions. High cation transport implies high efficiency for the SPE because the electroactive ion (the ion that undergoes an oxidation/ reduction process and in so doing generates energy) is selectively transported between the electrodes. Immobilizing the anions in the polymer host predisposes most or all of the ionic conductivity of the SPE to cation transport. This anion sequestration is accomplished by selecting an anion with a long alkane tail (dodecyl sulfate anion, $CH_3(CH_2)_{11}OSO_3^-$) that can become entangled with the polymer host. Other suitable anions are $CH_3(CH_2)_{5-50}OSO_3^-$; $CH_3(CH_2CH_2O)_{5-50}OSO_3^-CH_3(CH_2)_{5-50}(CH_2CH_2O)_{5-50}$; $OSO_3^-$ and mixtures thereof. In general, the ratio of the number of oxygen atoms in the polymer host to the number of Li ions is in the range of from about 5 to about 60, with about 8, 24 or 50 being preferred. The molecular weight of the polymer host can be from about 1000 to about 2 million.

A strong interaction of the lithium ions with the polymer host limits the mobility of the cations to the temperature-dependent motion of the polymer ether segment (polymer segmental motion). Chemical and structural variations to the alkane chain of the anion can be made to obstruct the multiple concerted interactions of ether oxygens with the lithium cations. The interferences can be steric interactions between adjacent polymer segments and intertwined anions. The alkane tail of the anion can acceptably include functional groups that interact with the methylene protons through hydrogen bonding interactions so that the polyether is not capable of strongly coordinating the lithium ions with multiple oxygen-cation interactions.

Long and branched alkane tails may be designed for the anion to increase steric interactions between the polymer host and the salt for the purpose of reducing the ability of salt/polymer complexes to form crystals. The formation of SPE crystals sequesters the ions and results in a reduction of mobile cations.

Long alkane chains are waxy materials that add soft mechanical properties to the more rigid polymer host. A flexible SPE is desirable because it allows the fabrication of a wide range of battery configurations.

In one example of the present invention, 0.129 g salt (lithium dodecyl sulfate) was added to 0.277 g polymer (PEO), and the mixture was dissolved in approximately 10 ml of THF. The solution was heated for several minutes at 60° C. The THF solvent was removed using an aspirator while the solution was heated and rotated in a vessel such that a thin film of the SPE was seen to form on the vessel wall. The film was allowed to dry further in a chamber of very dry and flowing nitrogen gas. The mole ratio of the oxygen atoms of the polymer host to the lithium ions from the salt was 13.29. An oxygen to Li+ ratio in the range 6–20 is desirable.

In another example of the present invention, 0.300 g salt (lithium dodecyl sulfate) was added to 0.500 g polymer (PEO), and the mixture was dissolved in approximately 20 ml of THF. The solution was heated for several minutes at 60° C. The THF solvent was removed using an aspirator while the solution was heated and rotated in a vessel such that a thin film of the SPE was seen to form on the vessel wall. The film was allowed to dry further in a chamber of very dry and flowing nitrogen gas. The mole ratio of the oxygen atoms of the polymer host to the lithium ions from the salt was 10.31.

A third example of the present invention was made when 0.112 g salt (lithium dodecyl sulfate) was added to 0.258 g polymer (PEO), and the mixture was dissolved in approximately 40 ml of THF. The solution was heated for several minutes at 60–80° C. The THF solvent was removed using an aspirator while the solution was heated and rotated in a vessel such that a thick flowing film of the SPE was seen to form on the vessel wall. The thick film was poured out onto a flat glass plate and allowed to dry in a chamber of very dry and flowing nitrogen gas. After several days an SPE film was formed that could be pealed from the glass. The mole ratio of the oxygen atoms of the polymer host to the lithium ions from the salt was 14.25.

The liquid electrolyte mixture described in the third example above was deposited onto a previously prepared dry carbon electrode in a dry nitrogen glove box. The THF solvent was allowed to evaporate from the SPE for several days. A piece of lithium foil was placed above the SPE. A strip of copper foil was placed on top of the lithium foil. A second strip of copper foil was placed in contact with the carbon electrode. The stacked assembly was sandwiched between two microscope slides thereby forming a lithium-ion test battery. The voltage of the battery reached approximately 3 volts.

The liquid electrolyte mixture described in the third example above was poured onto a flat glass plate and allowed to dry in a chamber of very dry and flowing nitrogen gas. After several days an SPE film was formed that could be pealed from the glass. A section of the film was pealed from the glass, and while still attached, the film was stretched. Using a microscope equipped with polarizers, it was shown that the stretched portion of the film was birefringent. The as-cast portion of the film was amorphous. The birefringent films of the present invention may have microscopically oriented fibers composed of polymer chains, and these fibers may exhibit anisotropic conductivity. A larger conductivity measured in the direction of the oriented fibers is believed to occur.

Figure 1:
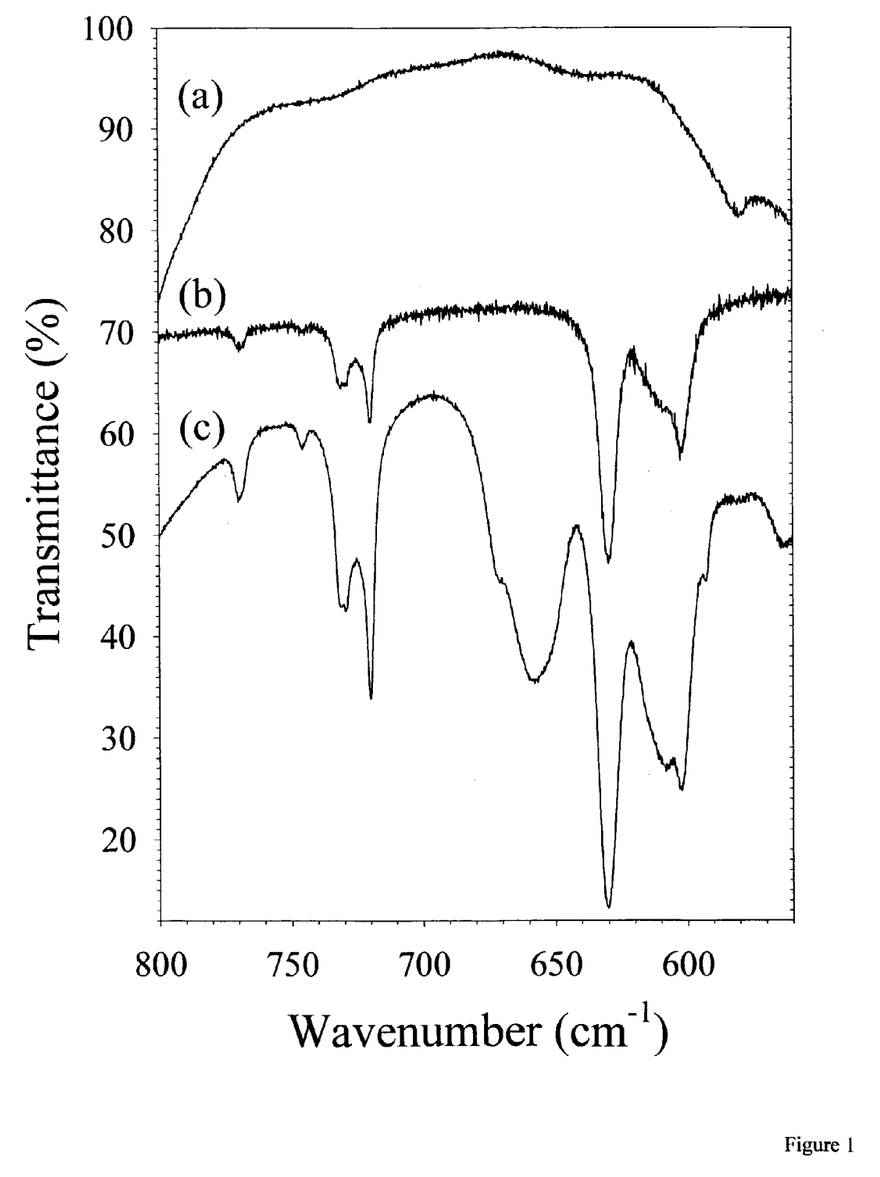
FIG. 1 are spectrographs showing the difference between PEO (FIG. 1A), lithium dodecyl sulfate (FIG. 1B), and the polymer electrolyte (FIG. 1C)
Figure 2:
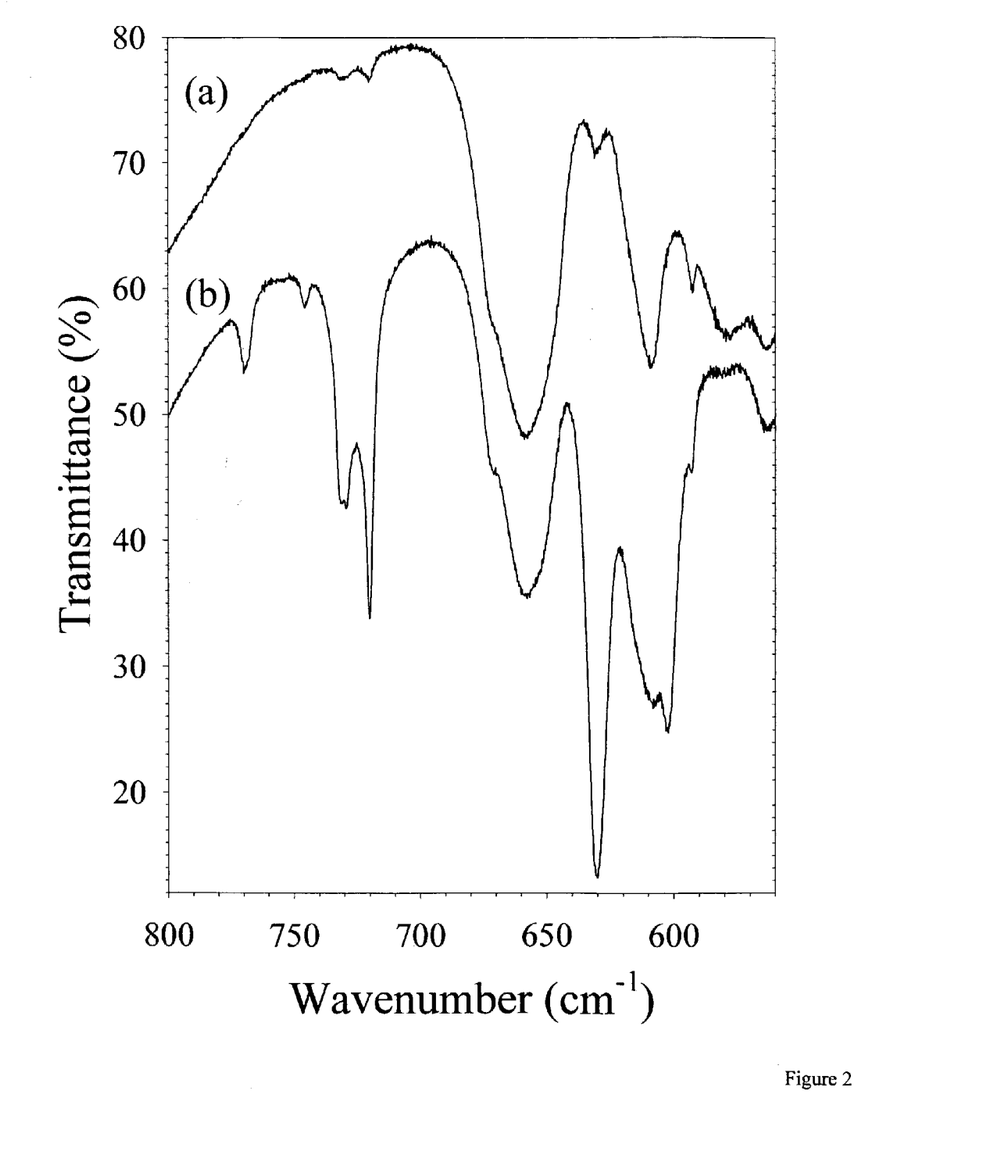
FIG. 2 is a graph similar to FIG. 1 showing two different polymer electrolyte samples.

Referring now to the drawings, the FTIR spectra in FIG. 1 illustrate key differences between PEO, lithium dodecyl sulfate, and the polymer electrolyte formed from these two components. In the spectral range 560–800 $cm^{-1}$ PEO exhibits broad and very weak bands (FIG. 1a). In the same spectral range, the salt reveals several strong bands (FIG. 1b). The two bands near 730 $cm^{-1}$ are assigned to the $CH_2$ rocking vibration in the alkane chain of the dodecyl sulfate anion. The split band appears as a single band in melts or solutions of the salt. Alkane chains in a crystalline phase produce a split band, as shown in FIG. 1b. The two strong bands near 600 $cm^{-1}$ and 630 $cm^{-1}$ are assigned to S—O—C vibrations of the anion head group. The FTIR spectrum of the polymer electrolyte is shown in FIG. 1c. A new band for the polymer electrolyte sample appears near 657 $cm^{-1}$ with a shoulder near 675 $cm^{-1}$. The appearance of the salt bands in the spectrum of the polymer electrolyte sample indicates that the material is composed of both a simple mixture of PEO and the salt, and a solution of the salt dissolved in the polymer. FIG. 2 compares FTIR spectra of two polymer electrolyte samples prepared under different conditions. In FIG. 2a the FTIR spectrum was recorded for a sample that was prepared by casting a THF solution of the PEO and salt, allowing the film to dry under nitrogen, pressing the film at 10,000 psi and 130° C. for several minutes, and then heating the film at 80° C. under vacuum for several hours. The spectrum is dominated by the new band near 657 $cm^{-1}$, and shows very weak bands for the —$CH_2$— rocking vibration and the anion sulfate group C—O—S stretch. The spectrum in FIG. 2b was recorded for a sample that was prepared by casting a THF solution of the PEO and salt, allowing the film to dry under nitrogen, and then pressing the film at 10,000 psi and 130° C. for several minutes. The spectra of polymer electrolyte films prepare by the latter procedure, which skips the annealing step (heating the film at 80° C. under vacuum for several hours), appear to be composed of PEO, undissolved salt, and a solution of the salt in PEO. The new band near 657 $cm^{-1}$ provides critical evidence that lithium dodecyl sulfate is dissolved in PEO, the first and necessary condition for a new solid-state ion conductor.

Figure 3:
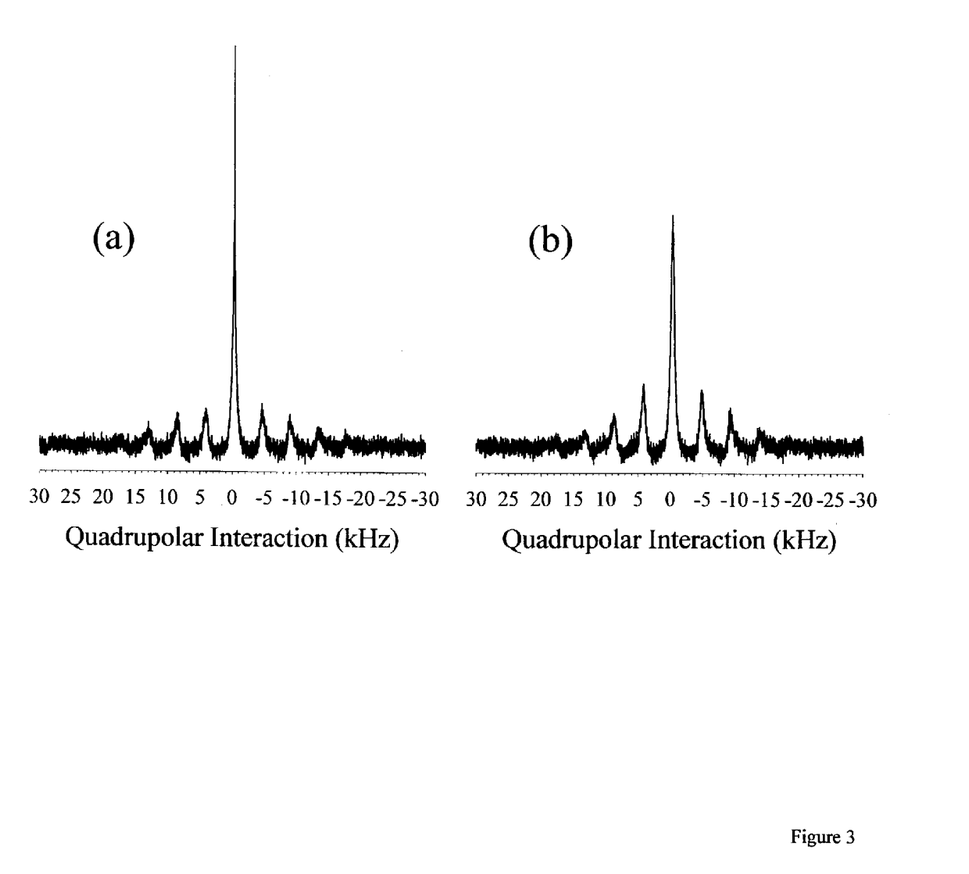
FIG. 3 are print-outs of magic angle spinning (MAS) nuclear magnetic resonance (NMR) spectra of a polymer electrolyte and lithium dodecyl sulfate salt.

Magic angle spinning (MAS) nuclear magnetic resonance (NMR) experiments are useful for investigating solid samples. Furthermore, measurements of NMR parameters for $^7Li$ nuclei in polymer electrolyte materials can reveal a distinction between lithium cations that are solvated, in tight ion pairs, or covalently bonded to other atoms. The $^7Li$ MAS NMR spectrum of the lithium dodecyl sulfate/PEO polymer electrolyte is shown in FIG. 3a. For comparison, the $^7Li$ MAS NMR spectrum of the salt is shown in FIG. 3b. The principal difference between the two spectra is the sharp, narrow resonance that is superposed on the broader salt spectrum. A series of peaks with uniform periodicity across the frequency axis (~4.3 kHz) are termed spinning side bands, and derive from the crystalline salt component. Lithium ions in amorphous regions of PEO are highly mobile compared to lithium ions in the crystalline salt, and do not give rise to spinning side bands. Thus, the spinning side bands observed for the polymer electrolyte sample provide corroborative data that undissolved salt is present in the polymer electrolyte sample.

Figure 4:
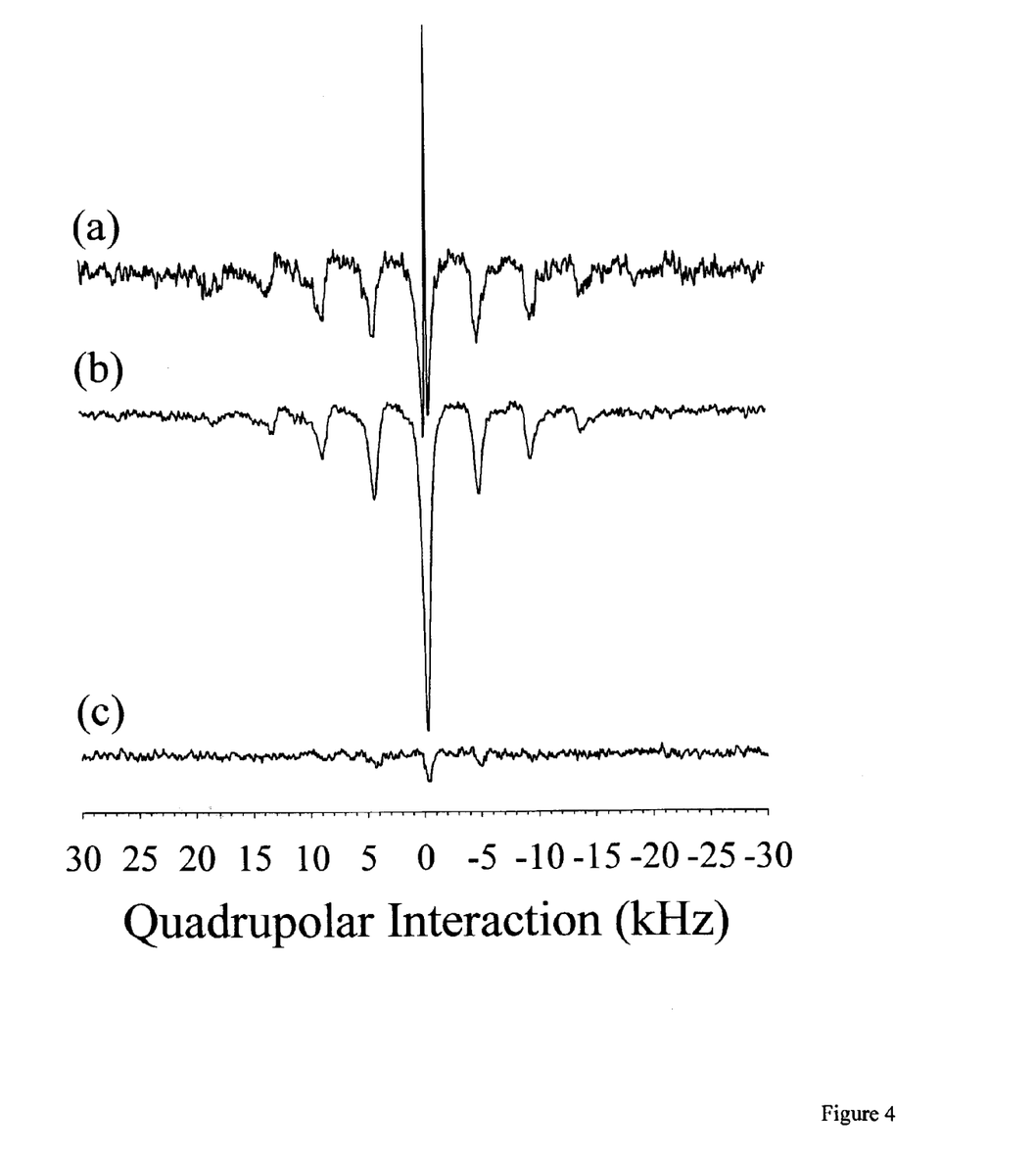
FIG. 4 is a MAS NMR spectrum showing spin-lattice relaxation of dissolved/undissolved salt in PEO.
Figure 5:
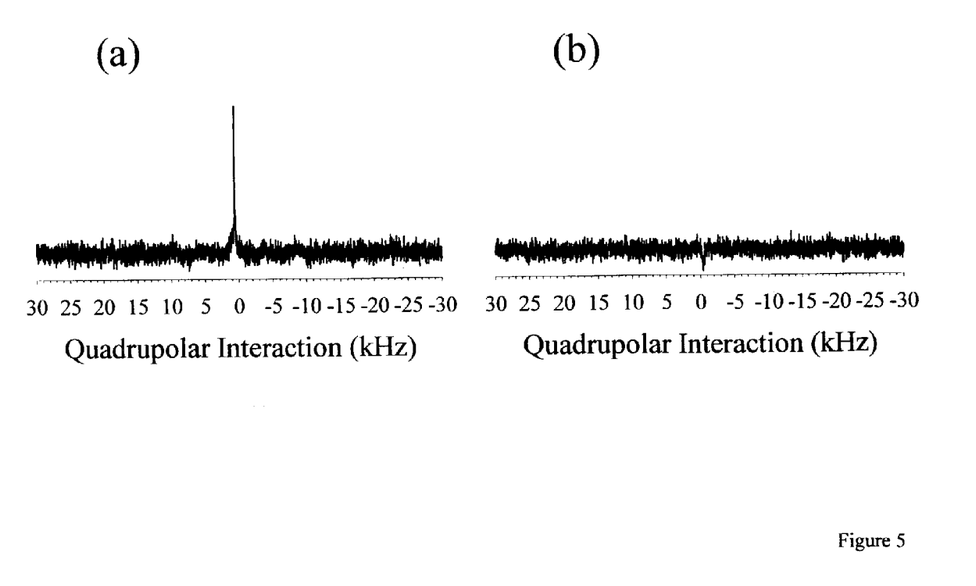
FIG. 5 is an MAS NMR spectrum of a PEO/dodecyl lithium sulfate polymer electrolyte sample showing dissolved/mobile lithium ions (FIG. 5A) and pure salt (FIG. 5B) showing no sharp signal, which indicates the absence of dissolved/mobile lithium ions.

The $^7Li$ MAS NMR spectra in FIG. 4 provide additional evidence from a molecular dynamics perspective that the polymer electrolyte is composed of dissolved and undissolved salt in PEO. Spin lattice relaxation experiments measure the characteristic lifetime ($T_1$) for recovery of the nuclear spin magnetization from an ensemble of spins that have been changed from thermal equilibrium. Lithium nuclei in rigid solids have characteristically long recovery times (long $T_1$ values); mobile lithium nuclei in PEO are characterized by short recovery times (short $T_1$ values). FIG. 4a shows the partial recovery of spin magnetization 2.4 seconds after an inversion of the spin magnetization. The spectrum reveals spinning side bands representing undissolved salt, and a narrow, upright center band component for the solvated lithium. The $^7Li$ MAS NMR spectrum of the salt, shown in FIG. 4b, was recorded under the same conditions, and does not show the narrow upright signal. The spectrum in FIG. 4c demonstrates that even at longer spin relaxation delays, the salt sample does not display the narrow center band that is characteristic for dissolved lithium ions. The $^7$Li MAS NMR spectrum of the polymer electrolyte sample in FIG. 5a demonstrates that for a particular choice of a relaxation delay period, the spectrum of the polymer electrolyte consists only of solvated lithium ions. The control spectrum (pure salt), shown in FIG. 5b was recorded following a delay period of 60 seconds after the inversion of the spin magnetization, and reveals a null spectrum (no signal).

Figure 6:
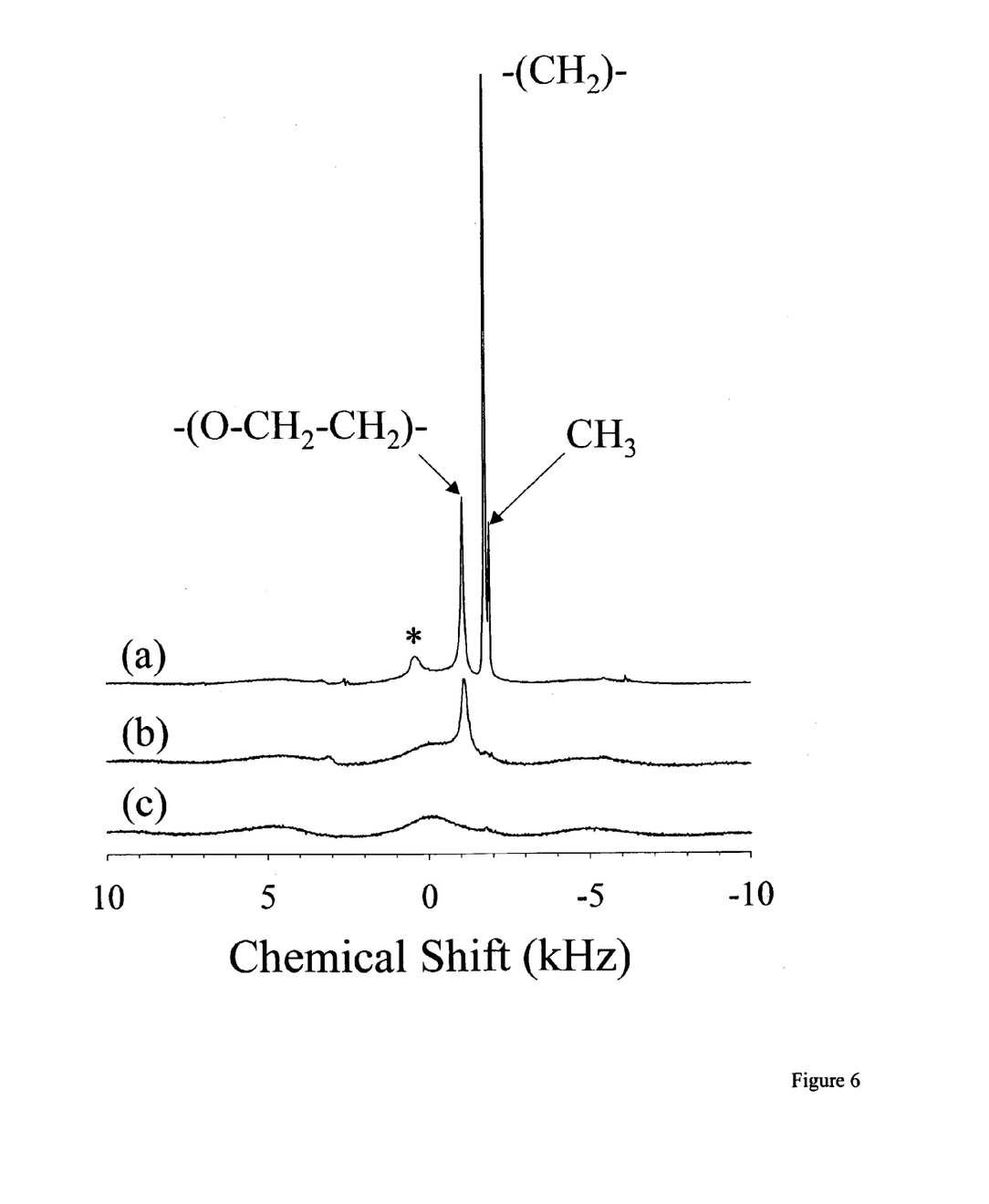
FIG. 6 is an MAS NMR of polymer electrolyte (FIG. 6A) and PEO (FIG. 6B) and the spectrum of the crystalline salt (FIG. 6C)

Proton MAS NMR experiments of solid materials provide limited information because it is not currently possible to average large magnetic dipole-dipole couplings with spinning rates currently achievable by commercial MAS probes. However, for semisolid materials, including polymer electrolytes, $^1$H MAS NMR can provide useful spectroscopic and molecular dynamics information. The reason $^1$H MAS NMR of polymer systems is useful is because the material is not a rigid solid, but instead exhibits considerable motion at the molecular scale. The molecular motions provide a separate avenue for effective averaging of magnetic dipole-dipole interactions. The $^1$H MAS NMR spectrum of the polymer electrolyte in FIG. 6a is compared with the spectrum of PEO (FIG. 6b) and the spectrum of the crystalline salt (FIG. 6c). The protons in the alkyl chains of lithium dodecyl sulfate are largely immobilized in the crystal lattice of the neat salt, and the intramolecular magnetic dipole-dipole interactions are ineffectively averaged by MAS. The resulting broad peaks are shown in FIG. 6c. The immobilized polymer chains in the crystalline phase of PEO (ca 80% w/w) produce a similar spectrum (FIG. 6b). However, a narrow resonance is observed for the PEO sample, which is attributed to the mobile amorphous phase of PEO (ca 20% w/w). The $^1$H MAS NMR spectrum of the polymer electrolyte (FIG. 6a) reveals the previously observed resonance for amorphous PEO, the broad peaks associated with undissolved salt and crystalline PEO, and several new resonances. The large resonance at the far right is located at the resonance frequency consistent with methylene protons in alkane chains, indicating that the alkane sulfate anion is locally highly mobile. Dissolution of the lithium salt in the amorphous PEO would introduce mobile lithium ions and remove the constraints imposed by the crystal lattice on the dynamics of the alkane chains. Mobile alkane chains effectively average magnetic dipole-dipole interactions and result in narrow NMR resonances. Thus, the $^1$H MAS NMR spectrum of the polymer electrolyte provides additional evidence that the salt is dissolved in the PEO. A third peak of low intensity, labeled with an asterisk, is also observed in the proton spectrum of the polymer electrolyte on the left side.

Figure 7:
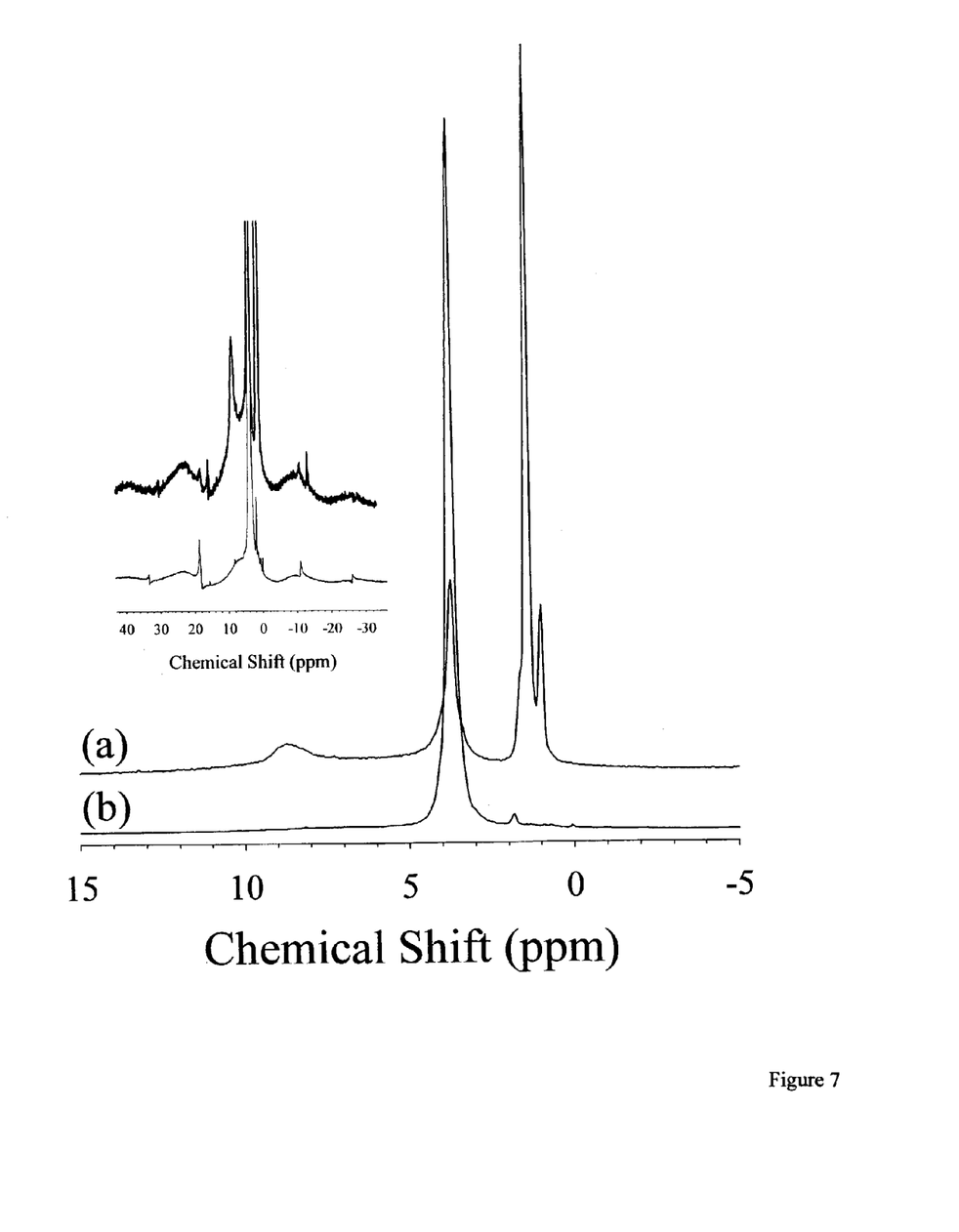
FIG. 7 is spectra like FIG. 6 showing a comparison between two different polymer electrolyte materials.

The $^1$H MAS NMR spectra in FIG. 7 show a comparison between two polymer electrolyte materials. FIG. 7a is an expanded view of the spectrum in FIG. 6a, and reveals an additional resonance of low intensity, which is assigned to the methyl protons of the alkane chain. The spectrum in FIG. 7b was recorded for a polymer electrolyte composed of PEO and lithium TFSI (chemical formula, $LiN(SO_2CF_3)_2$). The TFSI anion does not contain protons, thus the narrow resonance arises from the amorphous PEO methylene protons. The inset in FIG. 7 shows a vertically expanded view of both spectra, revealing the broad peaks associated with crystalline PEO for both samples.

Figure 8:
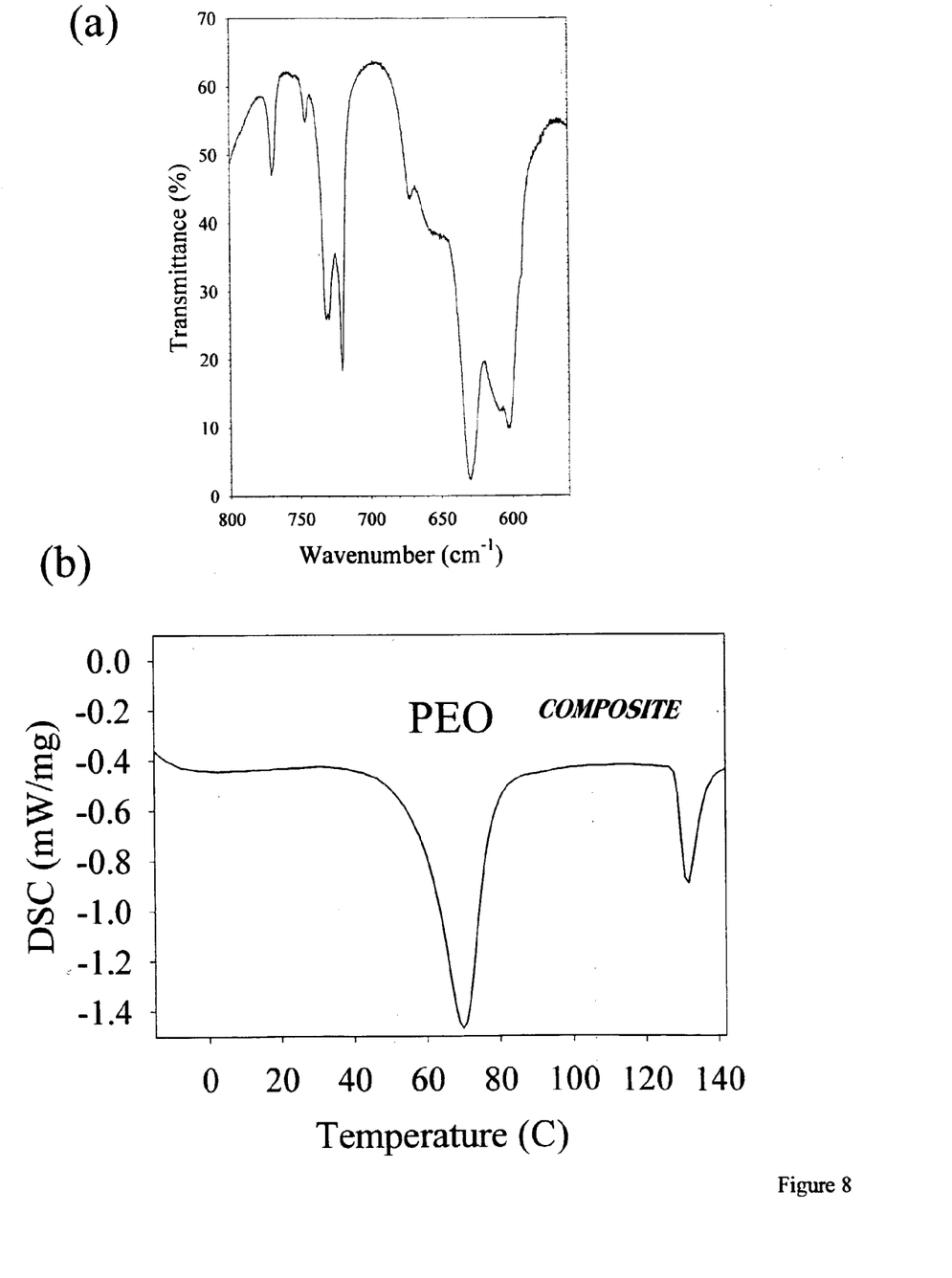
FIG. 8 is a graph showing the differential scanning calorimetry (DCS) for the polymer electrolyte and a FTIR spectrum for the polymer electrolyte.

FIG. 8 includes the differential scanning calorimetry (DCS) curve for the polymer electrolyte and the FTIR spectrum of the actual polymer electrolyte sample used for the DSC measurement. The FTIR spectrum shows that the polymer electrolyte sample contains dissolved and undissolved salt. The DCS data confirms the presence of crystalline PEO and a stoichiometric PEO/salt complex. The crystalline PEO in the polymer electrolyte sample was reduced by 24.8% relative to pure PEO, indicating dissolution of the salt by the polymer.

Figure 9:
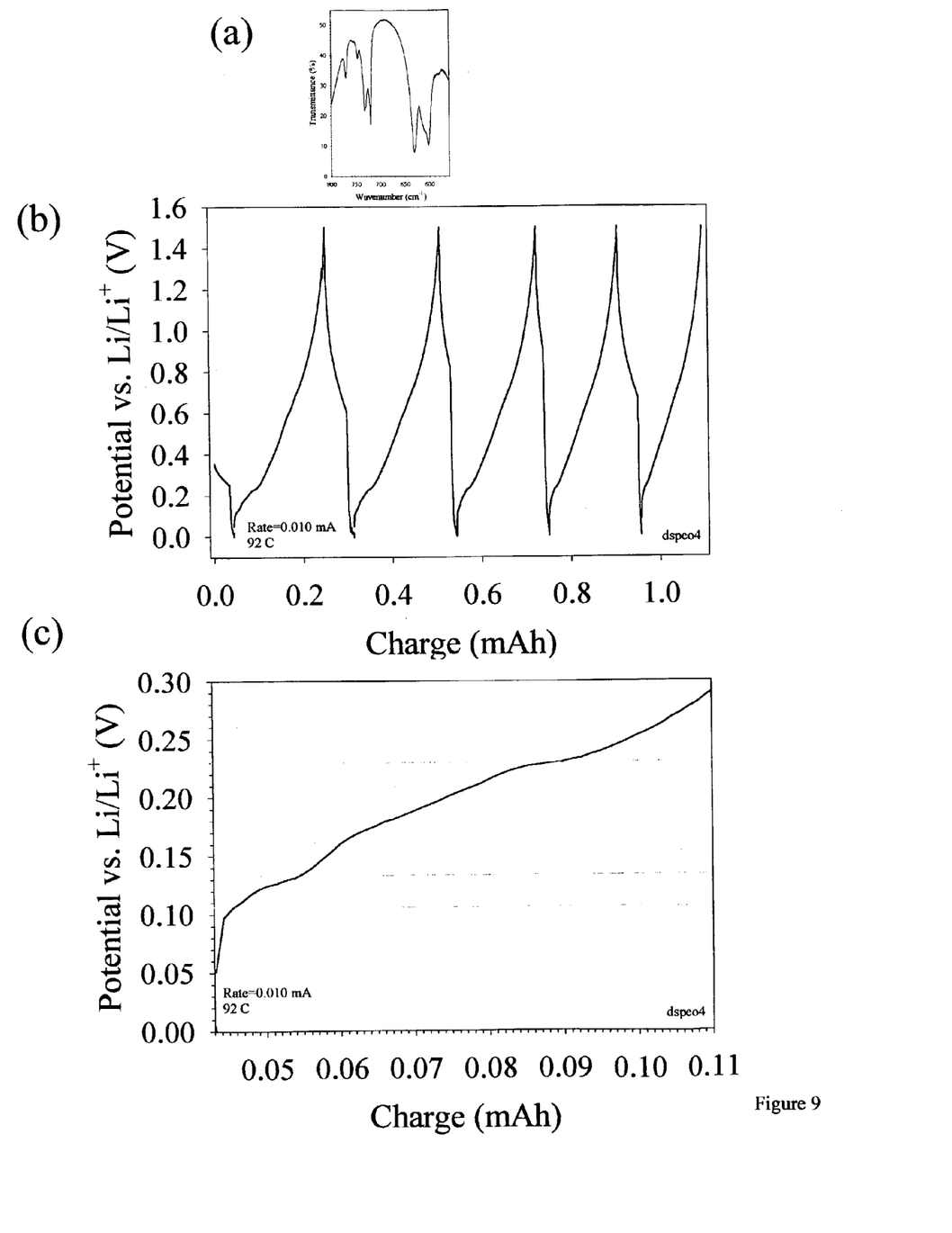
FIG. 9 illustrates preliminary electrochemical cycling results for a specific electrolyte.
Figure 10:
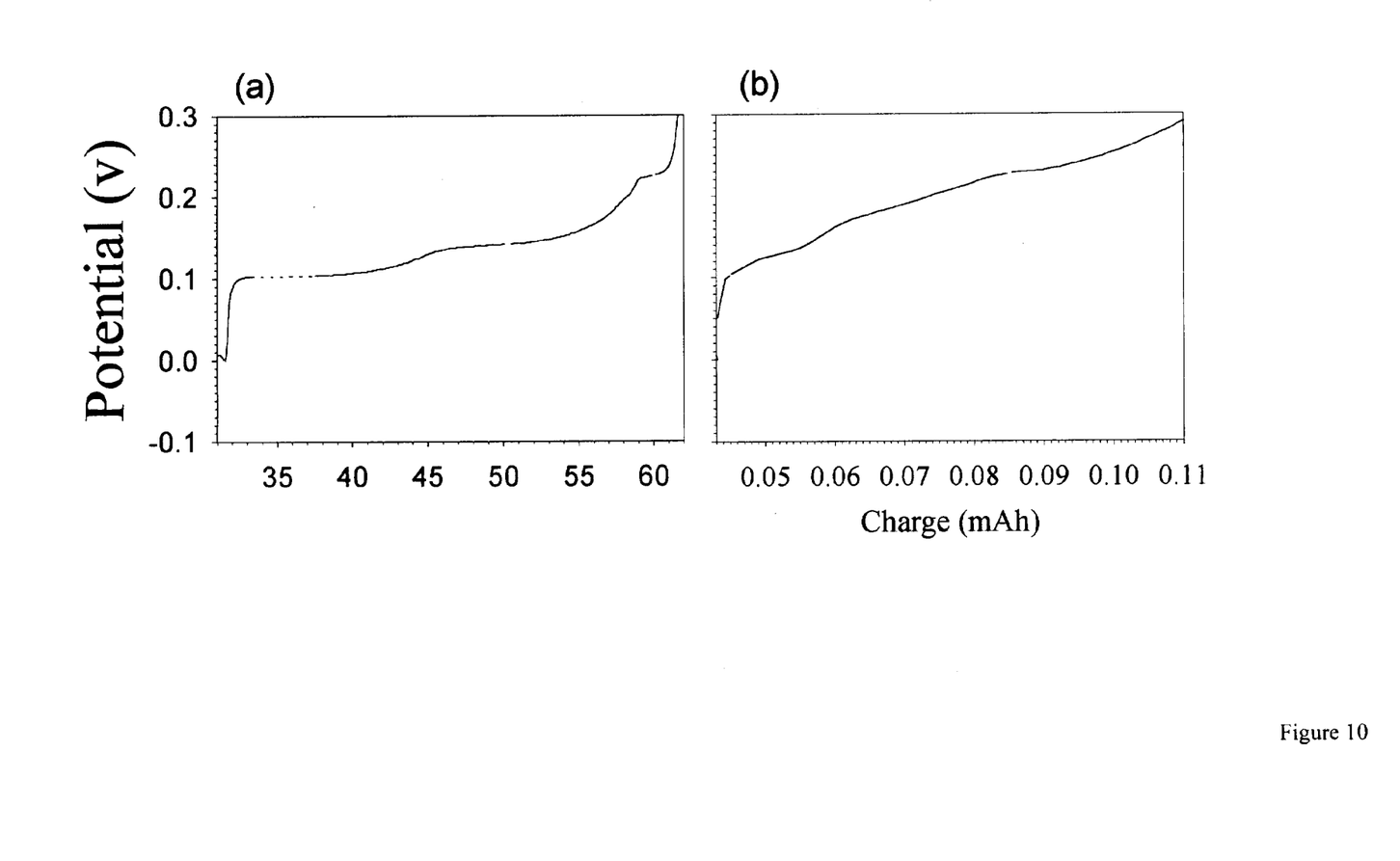
FIG. 10 shows a comparison of a typical charge curve for a commercially available liquid electrolyte compared to the curve for an electrolyte cell employing the present invention.

FIG. 9 shows preliminary electrochemical cycling results for the lithium dodecyl sulfate/PEO polymer electrolyte. The polymer electrolyte film sample was prepared by mixing dry powders of PEO and salt. The mixture was pressed and heated at 1000 psi and 80° C. for several minutes. The FTIR spectrum of the pressed film is shown in FIG. 9a, and indicates that the film consists of a simple mixture of PEO and salt. This film was used as the electrolyte in a coin cell with a lithium anode and a graphitic carbon cathode. The cell was heated to 100° C. for several days to affect dissolution of the salt in the PEO. FIG. 9b shows a series of 5 discharge/charge cycles for the coin cell. An expanded view of the charge curve in the first cycle is shown in FIG. 9c. A comparison of this curve with a typical charge curve for a commercially available liquid electrolyte is shown in FIG. 10. The voltage plateaus of the polymer electrolyte cell (FIG. 10b) closely resemble the corresponding plateaus from the liquid electrolyte cell (FIG. 10a). The preliminary cycling data demonstrates the capability of the polymer electrolyte to conduct lithium ions during charge and discharge cycles of the coin cell.

While particular embodiments of the present invention have been shown and described, it will be obvious to those skilled in the relevant art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The invention claimed is:

1. A solid state ion conducting electrolyte, consisting essentially of a polymer matrix of poly(ethylene oxide) having a lithium salt with an anion of dodecyl sulfate dissolved therein, wherein the ratio of the number of oxygen atoms in the matrix to the number of lithium ions in the salt is between about 5 and about 60.

* * * * *